United States Patent
Liu et al.

(10) Patent No.: US 9,016,286 B2
(45) Date of Patent: Apr. 28, 2015

(54) METHOD AND EQUIPMENT FOR ADDING TOBACCO DUST INTO PAPERMAKING TOBACCO SHEET

(75) Inventors: Jianfu Liu, Changsha (CN); Xinliang Tan, Changsha (CN); Jianshan Fu, Changsha (CN); Dafeng Yin, Changsha (CN); Changjian Deng, Changsha (CN); Gang Chen, Changsha (CN)

(73) Assignee: China Tobacco Hunan Industrial Co. Ltd. (CN)

( * ) Notice: Subject to any disclaimer, the term of this patent is extended or adjusted under 35 U.S.C. 154(b) by 1516 days.

(21) Appl. No.: 12/088,407

(22) PCT Filed: Mar. 24, 2006

(86) PCT No.: PCT/CN2006/000484
§ 371 (c)(1),
(2), (4) Date: Mar. 27, 2008

(87) PCT Pub. No.: WO2007/036092
PCT Pub. Date: Apr. 5, 2007

(65) Prior Publication Data
US 2008/0245379 A1    Oct. 9, 2008

(30) Foreign Application Priority Data

Sep. 28, 2005 (CN) .......................... 2005 1 0032200
Sep. 28, 2005 (CN) ...................... 2005 2 0052033 U
Sep. 28, 2005 (CN) ...................... 2005 2 0052034 U

(51) Int. Cl.
*A24B 3/14* (2006.01)
*B01F 3/12* (2006.01)
(Continued)

(52) U.S. Cl.
CPC . *A24B 3/14* (2013.01); *A24B 15/24* (2013.01); *B01F 3/1221* (2013.01);
(Continued)

(58) Field of Classification Search
CPC ............................... D21H 23/00; D21H 17/67
See application file for complete search history.

(56) References Cited

U.S. PATENT DOCUMENTS 3,182,966 A * 5/1965 Carlsson ...................... 366/136
4,341,228 A * 7/1982 Keritsis et al. ................ 131/354
(Continued)

FOREIGN PATENT DOCUMENTS

CN           1093890 A        10/1994
EP         0 147 216 A2        7/1985
(Continued)

OTHER PUBLICATIONS

European Patent Office (EPO), Supplementary European Search Report and Written Opinion for European Patent Application EP 06 72 2136 dated Feb. 3, 2010, 8 pages.
(Continued)

*Primary Examiner* — Michael J Felton
(74) *Attorney, Agent, or Firm* — Beem Patent Law Firm

(57) ABSTRACT

This invention discloses a method for adding tobacco dust in production process of the papermaking tobacco sheet and its equipment. The tobacco dust is added in 5-30% weight at four process points such as the pipeline from the slurry stabilization box to the slurry flow box, the long-net of the papermaking machine, the position from the vacuum couch to the first press, and the coating position on the papermaking machine. This invention adopts a method for adding the tobacco dust in production process of papermaking tobacco sheet, which has well improved its physical performances including the filling capacity of the papermaking tobacco sheet and solved smoking problems of the papermaking tobacco sheet, such as worse inherent quality, heavy stemy note, insipid tobacco aroma and etc. In addition, this method has also offered a good way to well utilize tobacco dust resource in sizes of 2 mm-100 mesh, which is abnegated in cigarette production, to save resource and to reduce the cigarette cost.

6 Claims, 3 Drawing Sheets

(51) Int. Cl.
- *B01F 7/02* (2006.01)
- *B01F 7/20* (2006.01)
- *B01F 13/10* (2006.01)
- *B01F 15/00* (2006.01)
- *B01F 15/02* (2006.01)
- *A24B 15/24* (2006.01)
- *B01F 7/00* (2006.01)
- *B65G 53/46* (2006.01)

(52) U.S. Cl.
CPC ........ B01F 7/00125 (2013.01); B01F 7/00133 (2013.01); B01F 7/00141 (2013.01); B01F 7/00641 (2013.01); *B01F 7/02* (2013.01); *B01F 7/20* (2013.01); *B01F 13/1027* (2013.01); *B01F 15/00025* (2013.01); *B01F 15/0251* (2013.01); B01F 2215/0078 (2013.01); B65G 53/4633 (2013.01)

(56) References Cited

U.S. PATENT DOCUMENTS

| | | | |
|---|---|---|---|
| 4,632,131 A * | 12/1986 | Burnett et al. | 131/355 |
| 4,787,402 A | 11/1988 | Leonard | |
| 5,322,076 A | 6/1994 | Brinkley et al. | |
| 5,342,485 A * | 8/1994 | Armbrust, Jr. | 162/181.5 |
| 5,584,306 A | 12/1996 | Beauman et al. | |
| 2004/0177857 A1 | 9/2004 | Nakanishi et al. | |

FOREIGN PATENT DOCUMENTS

| | | |
|---|---|---|
| EP | 0 399 697 A2 | 11/1990 |
| EP | 0 565 360 A2 | 10/1993 |
| GB | 2 070 410 A | 9/1981 |

OTHER PUBLICATIONS

Written Opinion of the International Searching Authority; International Application No. PCT/CN2006/000484.
English Translation of the Abstract of CN 1093890A (CN 1093890A has previously been submitted).
English Translation of the Abstract of the article: Han Qing, et al., *Manufacture Techniques of Papermaking to Tobacco Leaf*, Journal of Northwest University Light Industry, 2002, No. 1, pp. 19-22.
International Search Report ; International Application No. PCT/CN2006/000484.
Han Qing, et al., *Manufacture Techniques of Papermaking to Tobacco Leaf*, Journal of Northwest University of Light Industry, 2002, No. 1, pp. 19-22.

* cited by examiner

METHOD AND EQUIPMENT FOR ADDING TOBACCO DUST INTO PAPERMAKING TOBACCO SHEET

This application claims priority to Chinese patent application CN-200520052033.7, filed Sep. 28, 2005, and to Chinese patent application CN-200520052034.1, filed Sep. 28, 2005, and to Chinese patent application CN-200510032200.6, filed Sep. 28, 2005, and to PCT/CN2006/0000484, filed Mar. 24, 2006.

TECHNICAL FIELDS

This invention involves a method and its special equipment for adding tobacco dust into papermaking tobacco sheet.

TECHNICAL BACKGROUND

Tobacco sheet is a reconstituted tobacco made via re-composing and processing by using tobacco wastes as raw materials, such as tobacco dust, stem, leaf-scrap and some parts of low-grade tobacco-leaf formed during cigarette manufacture process. First, it can utilize raw leaf materials as many as possible to save cigarette cost; second, tobacco sheet has important role in reducing tar release and minimizing cigarette harm. Currently, papermaking process is the one most widely used in the tobacco sheet production. Physical performances of the tobacco sheet made by papermaking process are much better than that made by slurry process, which can effectively reduce tar and harm in cigarette smoke.

Generally, preparation method of papermaking process tobacco sheet includes steps as follows: to immerge and to extract tobacco materials (stem and leaf-scrap) by hot water; to separate tobacco's water-soluble matters from insoluble materials such as tobacco's fiber and etc. via solid-liquid separation process; to put the separated fibers on papermaker machine to shape flake base, and to distill and to concentrate the water-soluble matters to obtain tobacco extract; to immerge or to spray the flake base by the extract; finally to dry the extract-coated flake base to obtain the tobacco sheet.

There are many methods for producing papermaking tobacco sheet in the current technologies, but improvements released by current technologies for tobacco sheet production methods have been mainly focused on how to treat production materials of the sheet.

There is an extraction process of leaf scrap in current production methods for papermaking tobacco sheet. Because efficiency of the extraction is lower, tobacco flavor ingredients resided in the leaf scrap lose during long sequential process, resulting in the papermaking tobacco sheet with worse inherent quality, heavy stemy taste, insipid smoke and even less.

In other hand, because the papermaking tobacco sheet is produced by the tobacco stem and leaf scrap (over 2 mm) as its raw material, some parts of tobacco are not effectively utilized, such as the tobacco dust in diameters of 2 mm-100 mesh formed in cigarette process, or low-grade tobacco leaf, or scrap that is produced in threshing and redrying process and is difficult to be used in the sequential process of current cigarette manufacture, therefore, the raw material resource is wasted.

DETAILED DESCRIPTION

The technical problem that will be solved by this invention is to offer a method for adding the tobacco dust in production process of the papermaking tobacco sheet, in order to solve the problems such as worse inherent quality, heavy stemy taste and insipid smoke and to solve the resource utilization problem of the tobacco dust in sizes of 2 mm-100 mesh abnegated in cigarette manufacture for saving resources and reducing cigarette cost.

For solving the technical problems mentioned above, the methods adopted in this invention are: to add the tobacco dust, at least, at one of four process points such as pipeline 12 position from slurry stabilization box 14 to slurry flow box 16, long-net 18 on papermaking machine 10, position between vacuum couch 20 to first press 22 and coating position 24 of the papermaking machine, in adding dust proportion of 5-30% weight.

In this invention, the tobacco dust refers to scraps in diameter of 2 mm or less, produced in whole tobacco process, or produced in mechanical, delivering stations and etc., or prepared by using tobacco leaf and leaf scrap.

Adding the tobacco dust at the slurry flow pipeline process point from the slurry stabilization box to slurry flow box refers to that: the dry tobacco dust is wholly or partly mixed with slurry before mat-forming and then the mixed slurry is mat-formed on long-net into flake base; or refers to that: the tobacco dust is first mixed with water to make wet tobacco dust that is then mixed partly or wholly with the slurry before mat-forming, and finally the mixed slurry is mat-formed into flake base.

The perfect tobacco dust is in diameters of 1 mm-60 mesh.

Adding the tobacco dust at long-net process point of the papermaking machine refers to that: the tobacco dust is homogeneously sprayed or directly added onto wet slurry on a section of long-net of the papermaking machine from the slurry flow box to the vacuum couch.

Adding the tobacco dust at process point from the vacuum couch 20 to the first press 22 refers to that: the tobacco dust is added or homogeneously sprayed onto the wet sheet base 26 in a way from the vacuum couch to the first press.

Adding the tobacco dust at process point of coating position of the papermaking machine refers to that: the tobacco dust is added at process point of coating a concentrated solution and adding additive to the sheet on the papermaking machine. The coating position includes first coating and second coating.

The tobacco dust added at process points such as the long-net of the papermaking machine, the position from the vacuum to the first press, the coating position of the papermaking machine is perfectly in 20-100 mesh, more perfectly in diameter of 40-80 mesh.

Adding the tobacco dust at process point of the coating position of the papermaking machine can be in two manners, directly adding, or first mixing the tobacco dust with gum and then adding, wherein, the gum can be CMC, starch, modified starch, xanthan gum, Guar gum and etc.

For keeping the tobacco dust homogeneous in coating tank, there are two stirring manners, mechanical stirring and supersonic stirring for adding the tobacco dust at process point of coating of the papermaking machine.

For realizing the tobacco dust adding process mentioned above, this invention also offers related equipment, of which one is suitable for treating the tobacco dust in size of 2 mm-60 mesh, which is called as coarse-dust mixing device; other equipment is applicable to treating the tobacco dust in size of 20-100 mesh, which is called as fine-dust splashing device.

The coarse-dust mixing device includes a vertical mixing drum, on which there are raw slurry inlet and mixed slurry outlet equipped. At the upper part of the vertical mixing drum, a vertical stirring device is equipped axially, and at its lower part, a horizontal stirring device is installed radially. Coarse dust hopper is connected with the upper part of the said vertical mixing drum through coarse dust feeding device.

The coarse-dust feeding device is a screwed feeding device.

As an improvement for the coarse-dust mixing device mentioned above, a cleanout pipe is equipped at the upper part of the vertical stirring drum.

Combined stirring way of the vertical stirring device and the horizontal stirring device is adopted for the high-speed mixing device of the coarse-dust mentioned above, and rated feeding can be used for the coarse-dust feeding device, of which all makes the coarse dust completely mixed with the raw slurry.

Fine-coarse splashing device includes a feed-bin installed at upper part of the house, a feed-distribution roller equipped axially and horizontally within the said house and corresponded to the said feed-bin's outlet, a fine dust feed-groove equipped on external surface of the said feed-distribution roller, a ration controller corresponded to the feed-distribution roller and equipped within the said house, one or more dust scattering rollers acted on the said feed-distribution roller installed between the said house's outlet and the said feed-distribution roller.

Two dust scattering rollers are perfectly equipped.

When two dust scattering rollers are equipped, perfectly one dust scattering roller is arrange with its rotation direction as the same as that of the feed-distribution roller and other in reversal direction.

In the whole process of adding the tobacco dust, one or more process points can be selected from the four process points mentioned above, and two kind of devices can be simultaneously used to add the tobacco dust in different size at the point (actually, at on process station).

Two of the dust adding points shall be selected in priority for simultaneously or separately adding the tobacco dust in production. The first one is the process point at slurry flow pipeline from the slurry stabilization box to the slurry flow box, at this point the tobacco dust in diameter of 2 mm-40 mesh is added via the coarse-dust mixing device, which is mixed with the slurry sufficiently; the second one is the process point on the long-net of the papermaking machine, at this point the fine-dust in size of 20-100 mesh is sprayed from the house's outlet by using the fine-dust splashing device onto the wet base located on water-filtering net.

The core of this invention is to create a dust-adding method in production process of papermaking tobacco sheet, on the basis of tobacco sheet smoking quality and according to characteristics of the tobacco sheet. By using this method to add the tobacco dust, the smoking quality of the tobacco sheet is outstandingly improved, especially in its inherent tobacco aroma, increased papermaking tobacco sheet can be used in the cigarette composition, tobacco resource is more sufficiently utilized by reusing the tobacco dust in size of 2 mm-100 mesh originally abnegated in the cigarette production process, which saves resources and reduces cigarette production cost.

ILLUSTRATIONS FOR DRAWINGS

FIG. 4 is a schematic diagram of a simplified representation of the process disclosed herein.

PRACTICAL EMBODIMENT MANNER

Figure 1:
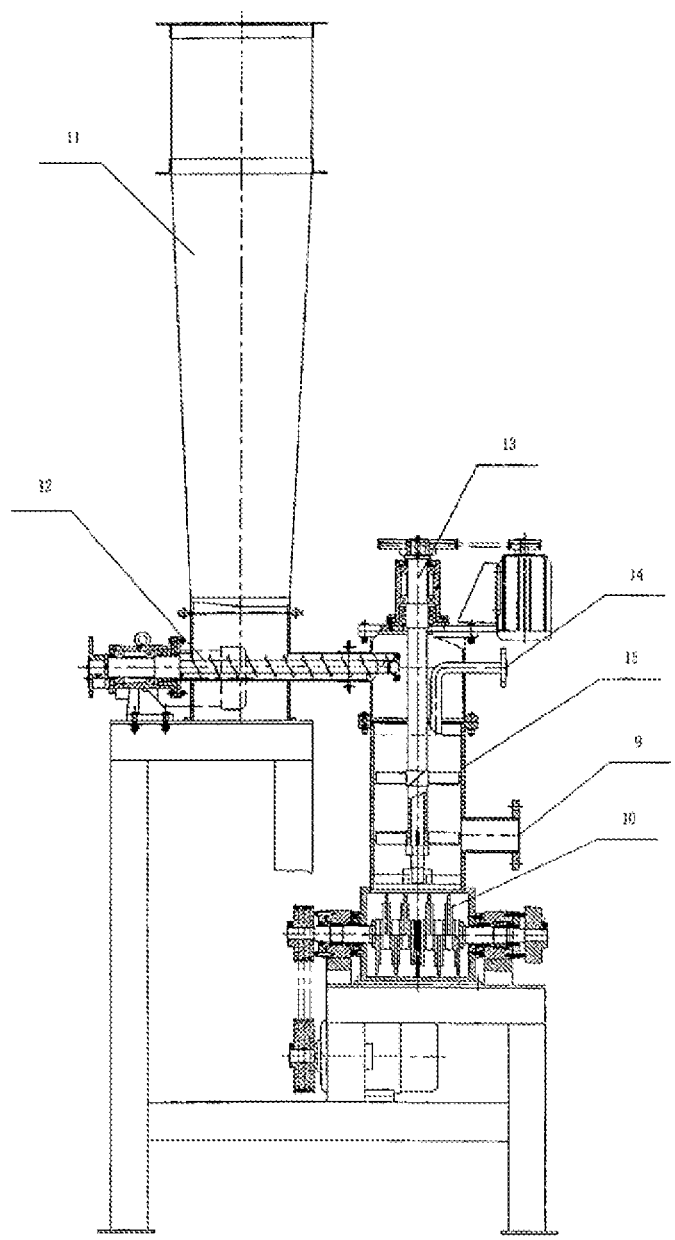
FIG. 1 is a structural drawing for the coarse-dust mixing device in this invention.

Embodiments 1-7 are the ones for the dust adding process methods; embodiments 8-9 are the ones for the dust adding devices.

Embodiment 1

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight), which is then mat-formed by the papermaking machine into fiber flake base, the tobacco stem extract is abnegated, the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are insipid aroma with sufficient volume, rough smoke, rough throat feeling, new smoke taste, stemy note and other impurity note, some residue on mouth, heavier flavor taste, loose smoke and less vigor.

Embodiment 2

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight), the dry tobacco dust (in size of 20-60 mesh) is added via the designed dust adding device at process point on the slurry flow pipeline from the slurry stabilization box to the slurry flow box, the mixture is then mat-formed by the papermaking machine into fiber flake base, the tobacco dust proportion is 20% (in the sheet weight). The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are sufficient aroma with good quality, fine and soft smoke, somewhat stemy note and other impurity note, cleaner residual taste and middle vigor. This tobacco sheet keeps inherent tobacco aroma to give obvious tobacco tincture with good smoking quality.

Embodiment 3

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight), the dry tobacco dust (in size of 20-60 mesh) is added into the finished slurry pool in 30% weight, the mixture is then mat-formed by the papermaking machine into fiber flake base. The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are sufficient aroma with good quality, fine and soft smoke, lighter stemy note, cleaner residual taste and middle vigor. This tobacco sheet keeps inherent tobacco aroma with good smoking quality.

Embodiment 4

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight), the dry tobacco dust (in size of 40-80 mesh) is homogenously sprayed onto the wet slurry on the net in 5% weight via specially designed dust adding device at process point in section from the slurry flow box to the vacuum couch of the papermaking machine and on the water-filtering net, which is then mat-formed by the papermaking machine into fiber flake base. The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are somewhat sufficient aroma with middle-level quality, somewhat fine and soft smoke, stemy note and other impurity note, cleaner residual taste and smaller vigor.

Embodiment 5

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight). The dry tobacco dust (in size of 50-80 mesh) is homogenously sprayed onto the wet slurry on the transference blanket (net) in 20% (tobacco sheet weight) via special dust adding device at process point in section from the vacuum couch to the first press, which is then mat-formed by the papermaking machine into fiber flake base. The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are sufficient aroma with good quality, fine and soft smoke, light stemy note, cleaner residual taste and middle vigor. This tobacco sheet keeps inherent tobacco aroma with good smoking quality.

Embodiment 6

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight). The dry tobacco dust (in size of 50-80 mesh) and CMC are added via mechanical stirring at the coating process point respectively in 10% (tobacco sheet weight) and 0.1% (tobacco sheet weight), which is then mat-formed by the papermaking machine into fiber flake base. The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are sufficient aroma with middle-level quality, fine and soft smoke, stemy note and other foreign taste, cleaner residual taste and small vigor.

Embodiment 7

Tobacco stem 700 kg and leaf scrap 700 kg are immerged respectively by hot water of temperature 60±5° C. and 30±5° C. for 1.5 hours, and then extracted and separated via solid/liquid separation to obtain solid tobacco stem and solid leaf scrap, and liquid tobacco stem extract and liquid leaf scrap extract. The defibrilated foreign fiber is added into the obtained tobacco stem fiber and the leaf scrap fiber (8% in sheet weight). The dry tobacco dust in size of 20-60 mesh is mixed first with water to wet tobacco dust and then added at process point on the slurry flow pipeline from the slurry stabilization box to the slurry flow box, and the mixture is then mat-formed in proportion of 20% (tobacco sheet weight) by the papermaking machine into fiber flake base. The tobacco stem extract is abnegated, but the leaf scrap extract is distilled and concentrated, which is then coated onto the shaped base that is then dried, threshed and shaped.

Appearance inspection indicated that the sheet has loose structure, and tests verified that its physical properties and parameters are all eligible.

Expert group evaluated on the basis of their smoking that the characters of this sheet are sufficient aroma with good quality, fine and soft smoke, slight stemy note, cleaner residual taste and middle vigor. This tobacco sheet keeps inherent tobacco aroma with good smoking quality.

Embodiment 8

Figure 2:
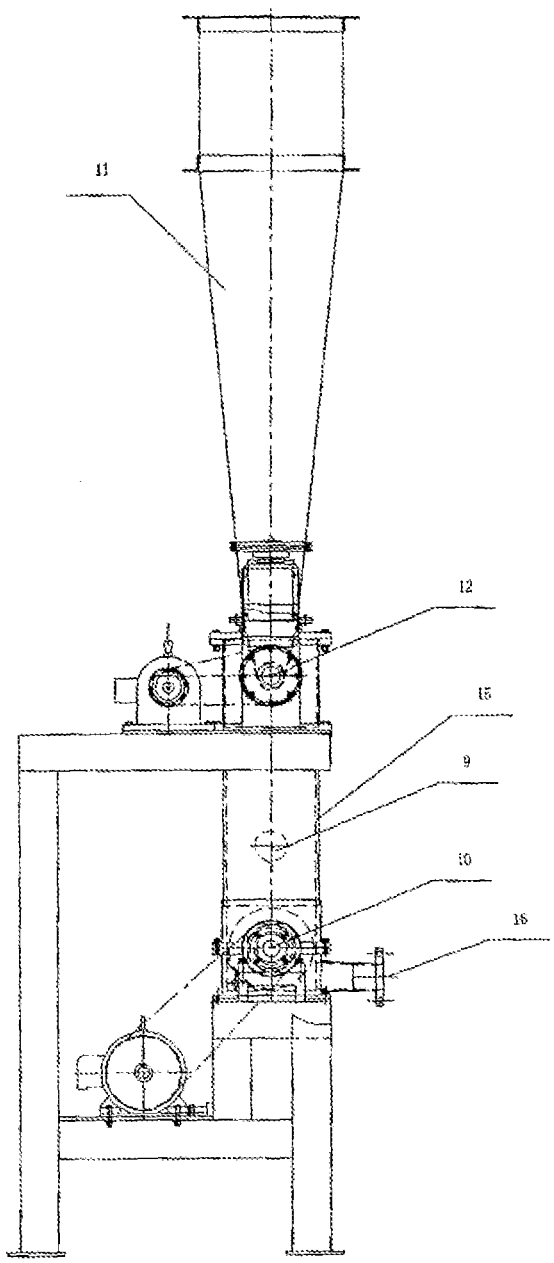
FIG. 2 is a left view drawing of the embodiment shown in FIG. 1.

See FIG. 1 and FIG. 2, the vertical stirring drum 15 is equipped with a raw slurry inlet 9 and a mixed slurry outlet 16. At the upper part of the vertical stirring drum 15, a vertical stirring device 13 is installed axially, and at its lower part, a horizontal stirring device 10 is installed radially. A coarse-dust hopper 11 is connected to the upper part of the vertical stirring drum via screw feeding device 12, and at the upper part of the vertical stirring drum 15 a cleaning pipe 14 is equipped.

When using the coarse-dust high-speed mixing device arranged by above technical scheme, first adding the coarse-dust into the coarse-dust hopper 11, the raw slurry enters into the vertical stirring drum 15 via the raw slurry inlet 9, then starting the vertical stirring device 13 and the horizontal stirring device 10 to operate. The coarse-dust in the coarse-dust hopper 11 feeds quantitatively the vertical stirring drum 15 via the coarse-dust feeding device 12, that is, the screw feeding device, the coarse-dust and the raw slurry is sufficiently stirred and mixed in the vertical stirring drum by the vertical stirring device and horizontal stirring device to much more homogeneousness. After the coarse-dust and the raw slurry is homogeneously mixed, the mixture discharges from the mixed slurry outlet into next process station for further use.

After the operation of the vertical stirring drum 15 stops, it is necessary to discharge the materials in it out completely, and can be cleaned via the cleaning pipe 14 and the cleaning liquid is discharged out via the mixed slurry outlet 16.

Embodiment 9

Figure 3:
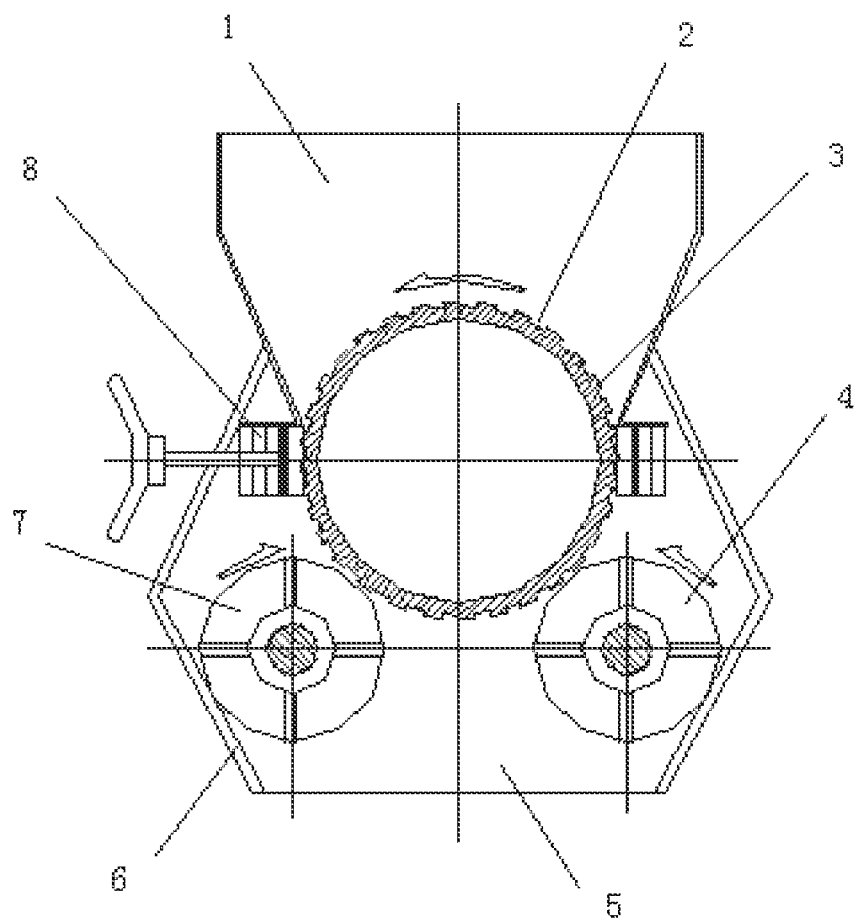
FIG. 3 is a structural drawing for the fine-dust splashing device in this invention.

Also see FIG. 3, a feed bin 1 is installed at the upper part of the house 6, a feed-distribution roller 3 corresponded to the said feed bin 1 is equipped within the house 6 axially and horizontally, feeding-grooves 2 able to hold the fine-dust are arranged on the external surface of the feed-distribution roller 3, a feed-rationed controller 8 corresponded to the said feed-distribution roller 3 is equipped within the house 6, first coating roller 7 and second coating roller 4 acting on the said feed-distribution roller 3 is arranged between the outlet 5 of the said house 6 and the said feed-distribution roller 3.

Loading the fine-dust in size of 20-100 mesh into the feed bin 1 and starting the feed-distribution roller 3, the first coating roller 7 and the second coating roller 4, the first coating roller 7 and the feed-distribution roller 3 are in the same tangent movement direction, and the second coating roller 4 and the feed-distribution roller 3 are the reversal tangent movement direction. The fine-dust enters into the feed-groove 2 of the feed-distribution roller 3, so adjusting the feed-rationed controller 8 can control the fine-dust quantity drawn out by the feed-distribution roller 3. The first coating roller 7 and the second coating roller 4 brush the fine-dust within the feed-groove 2 of the feed-distribution roller 3, so the fine-dust within the feed-groove 2 scatters out homogeneously under effects of the first coating roller 7 and the second coating roller 4, which then goes through the outlet 5 of the house 6 to spray onto the wet slurry on the water-filtering net.

The invention claimed is:

1. A method for adding tobacco dust in a production process of the papermaking tobacco sheet, comprising:
separating solid tobacco stem fiber and leaf scrap fiber from soluble tobacco stem extract and leaf scrap extract;
forming a slurry comprising the separated tobacco stem fibers and leaf scrap fibers;
flowing said slurry from a slurry stabilization box;
introducing said slurry into a coarse-dust mixing device;
screw-feeding tobacco dust into said coarse-dust mixing device during said slurry-introducing step; wherein
said tobacco dust is in an amount of 5-30% of a tobacco sheet weight at least in the production process of the papermaking tobacco sheet, the tobacco dust diameter being between 2 mm and 60 mesh or less;
mixing said slurry and said dust at high speed in said mixing device to create a dust-enriched mixture;
flowing said dust-enriched mixture to a slurry flow box;
mat-forming said dust-enriched mixture on a net;
wherein the coarse-dust mixing device includes a vertical stirring drum, a raw slurry inlet and a mixed slurry outlet equipped on the vertical stirring drum, a vertical stirring device axially arranged at an upper part of the vertical stirring drum, a horizontal stirring device radially installed at the lower part of the vertical stirring drum, a coarse-dust hopper connected to the upper part of the vertical stirring drum;
further adding tobacco dust at a dust-adding process point in the production process by a fine-dust splashing device,
wherein the fine-dust splashing device includes a feed bin equipped at an upper part of a house, a feed-distribution roller corresponded to the feed bin horizontally equipped within the house, a fine-dust held feed groove arranged on an external surface of the feed-distribution roller, a ration controller corresponded to the feed-distribution roller and equipped within the house, coating rollers acted on the feed-distribution roller and arranged between an outlet of the house and the feed-distribution roller.

2. The method according to claim 1, further comprising adding tobacco dust at a third dust-adding process point in the production process by either the coarse-dust mixing device, the fine-dust splashing device, or both.

3. The method according to claim 1, wherein the dust-adding process point is substantially contemporaneous with the slurry-introducing step.

4. The method according to claim 2, wherein the dust-adding process point is substantially contemporaneous with the slurry-introducing step.

5. The method according to claim 2, wherein the third dust-adding process point is not contemporaneous with the slurry-introducing step.

6. The method according to claim 2, wherein the dust-adding process point is not contemporaneous with the third dust-adding processing point.

* * * * *